United States Patent
Stickler et al.

(10) Patent No.: US 7,356,824 B2
(45) Date of Patent: Apr. 8, 2008

(54) SHARED SERVICES PLATFORM

(75) Inventors: Vantresa Stickler, Annapolis, MD (US); Lonie Pento, Staten Island, NY (US); Diane Ditzler, Falls Church, VA (US)

(73) Assignee: United States Postal Service, Washington, DC (US)

( * ) Notice: Subject to any disclaimer, the term of this patent is extended or adjusted under 35 U.S.C. 154(b) by 715 days.

(21) Appl. No.: 10/454,227

(22) Filed: Jun. 4, 2003

(65) Prior Publication Data

US 2004/0059640 A1 Mar. 25, 2004

Related U.S. Application Data

(60) Provisional application No. 60/407,371, filed on Aug. 29, 2002.

(51) Int. Cl.
- G06F 9/44 (2006.01)
- G06F 3/01 (2006.01)
- G06F 17/00 (2006.01)
- G06F 19/00 (2006.01)

(52) U.S. Cl. .............. 719/328; 719/313; 719/315; 719/330

(58) Field of Classification Search ........... 709/203; 719/313, 315, 328, 330; 705/401, 206, 412, 705/414

See application file for complete search history.

(56) References Cited

U.S. PATENT DOCUMENTS

| | | | |
|---|---|---|---|
| 5,857,100 A * | 1/1999 | Phillips et al. ............. 718/101 |
| 5,983,265 A | 11/1999 | Martino, II | |
| 6,041,318 A * | 3/2000 | Danford-Klein et al. .... 705/400 |
| 6,130,917 A | 10/2000 | Monroe | |
| 6,157,960 A * | 12/2000 | Kaminsky et al. .......... 719/315 |
| 6,192,419 B1 * | 2/2001 | Aditham et al. ............ 719/315 |
| 6,208,724 B1 | 3/2001 | Fritzinger et al. | |
| 6,282,579 B1 * | 8/2001 | Carre ......................... 719/313 |
| 6,378,002 B1 * | 4/2002 | Brobst et al. ............... 719/315 |
| 6,378,012 B1 | 4/2002 | Bass et al. | |

(Continued)

FOREIGN PATENT DOCUMENTS

WO WO 03047296 A2 * 5/2003

OTHER PUBLICATIONS

Robert Orfali and Dan Harkey. Client/Server Programming with JAVA and CORBA, 2nd Edition. John Wiley & Sons, Inc., 1998.*

Primary Examiner—William Thomson
Assistant Examiner—Richard Pantoliano, Jr.
(74) Attorney, Agent, or Firm—Lewis & Roca LLP

(57) ABSTRACT

A shared services hub is provided that allows a software application that is related to a given postal product, to access, translate, and communicate information related to a second postal service or module. A customer accessing the Postal Service website for a particular postal product, such as for example the Parcel Post or Global Express Mail, can then access further information. A communications link is established from the software application, through a shared services hub, to a software module. Information on the software module, such as for example, postage, shipping rules, or tracking information, is then translated and communicated through the software application in a compatible format. The shared services hub thus allows a plurality of information on software modules to be accessed through a plurality of product applications, regardless of communication protocols used by the software modules.

3 Claims, 1 Drawing Sheet

U.S. PATENT DOCUMENTS

| | | | |
|---|---|---|---|
| 6,401,081 B1 * | 6/2002 | Montgomery et al. | 705/63 |
| 6,549,937 B1 | 4/2003 | Auerbach et al. | |
| 6,563,919 B1 | 5/2003 | Aravamudhan et al. | |
| 6,619,544 B2 * | 9/2003 | Bator et al. | 235/381 |
| 6,990,513 B2 * | 1/2006 | Belfiore et al. | 709/203 |
| 2001/0020249 A1 * | 9/2001 | Shim | 709/220 |
| 2002/0198992 A1 * | 12/2002 | Stutz et al. | 709/225 |
| 2003/0014286 A1 * | 1/2003 | Cappellini | 705/5 |
| 2003/0023550 A1 * | 1/2003 | Lee | 705/40 |
| 2003/0028563 A1 * | 2/2003 | Stutz et al. | 707/513 |
| 2003/0097287 A1 * | 5/2003 | Franz et al. | 705/8 |
| 2003/0097345 A1 * | 5/2003 | Upton | 705/401 |
| 2003/0120608 A1 * | 6/2003 | Pereyra | 705/64 |
| 2004/0098355 A1 * | 5/2004 | Biasi et al. | 705/404 |

* cited by examiner

SHARED SERVICES PLATFORM

STATEMENT REGARDING FEDERALLY SPONSORED RESEARCH OR DEVELOPMENT

This application claims priority from U.S. Provisional Application No. 60/407,371 filed on Aug. 29, 2002 entitled "Shared Services Platform." The contents of the above application is relied upon and expressly incorporated by reference as if fully set forth herein.

BACKGROUND OF THE INVENTION

1. Field of the Invention

The invention relates to a system and method for permitting a plurality of software applications to share a plurality of software modules. The invention has particular benefit when one or more of the software applications uses a communications protocol that differs from the communications protocol employed by one or more of the software modules.

2. Description of the Related Art

The invention is discussed below in connection with shipping services. However, it is to be understood that the invention in its broadest sense is not so limited. The invention may be used whenever software applications need to share software modules.

For a web/ship application, there are certain core components or e-commerce features that may be needed, depending on the application, for customers to ship parcels without having to leave their homes or offices. For example, since government regulations require shippers to maintain basic information for purposes of crime prevention, web shipping applications typically require some form of customer registration. In addition, web shipping applications typically require customers to enter data about packages being shipped so that a shipping record may be completed and so that a shipping label may be transmitted electronically to customers. Parcel-specific data typically includes the recipient's address and the weight of the parcel. For international shipping, additional information may be collected including information on the contents of the parcel.

Web shipping applications usually also provide customers with the ability to pay online, and may also provide customers with the ability to request home or office pickup.

Often, companies write software applications without regard to other applications that have already been written. So, for example, a company that offers a menu of shipping services, might, over a period of time, write separate software for each shipping application. In these circumstances, each of a company's multiple applications may have a different look and feel, with multiple entities administering each application and, in doing so, duplicating efforts. For economy purposes, and for purposes of presenting a unified look and feel to customers, rather than rewriting each software application, it may be beneficial to allow software applications with overlapping requirements to share software "modules". So, for example, to save the cost of writing and administering a registration component for each new application, all applications could share a single software registration module administered by a single entity. In this way, customers accessing each application will be presented with uniform look and feel registration package, and any changes made will be reflected in all applications.

Complicating matters, however, is that software applications are often written in differing programming languages, and employ differing communications protocols. This can make it difficult for multiple applications to share the same software modules.

To remedy this complication, the invention includes a hub that may serve as a translational intermediary between software applications and software modules to be shared by the applications. The hub may be configured to recognize the communications protocols of the plurality of software modules and software applications, and to translate one protocol to another. Thus, regardless of the communications protocol of an application, the application may be able to communicate with and thereby share a software module that "speaks a different language."

SUMMARY OF THE INVENTION

The US Postal Service interacts with customers and consumers in numerous ways. Increasingly, one way in which the Postal Service offers services to customers is through the internet and other computer-facilitated communication links. It is expected that, increasingly in the future, postal services such as postage purchases, mail tracking, address updates, and other functions, will be transacted through the internet or other computerized communication.

It has now been conceived to link specific postal software applications with specific software modules by means of a shipping shared services hub. Specific postal products may be accessed over a communications network such as the internet. These include Global Express Guaranteed, Global Express Mail, Global Priority Mail, Domestic Express Mail, Priority Mail, and Parcel Post. For each of these products, a customer may also have occasion to access specific service capabilities that relate to each product. The service capabilities can be offered to a customer by means of software modules, and the service capabilities generally offer information or options related to a product. The service capabilities include Electronic Customs PreAdvice, Shipping Dos and Don'ts, Manifests, Address Book Management, Track/Confirm, Pick-Up, EM Network Directory, Email/Fax Notification, Online Payments and Accounting, User Registration, Indication of Postage, and Shopping Cart. The present invention thus allows a postal customer to review electronically certain postal products as well as specific services and information that are offered with that product.

In one embodiment, a method of sharing a plurality of software modules between a plurality of software applications is provided. In the method, the software modules and applications may be written in a plurality of differing programming languages and may use a plurality of differing communications protocols. The method further includes providing a shared services hub to serve as an interface between the software modules resident on a first plurality of servers and the software applications resident on a second plurality of servers; configuring the shared services hub to recognize the communications protocols of the plurality of software modules; enabling the plurality of applications to communicate with the shared services hub using at least one communications protocol that differs from a communications protocol of at least one of the software modules; and using the shared services hub to translate communications between software applications and software modules so that regardless of the communications protocols employed by the software modules, each of the plurality of applications is capable of communicating with the modules through the shared services hub.

In a further embodiment, a method of sharing a plurality of software modules between a plurality of software applications is also provided. In this method, the software modules and applications may be written in a plurality of differing programming languages and may use a plurality of differing communications protocols. The method also includes providing a shared services hub to serve as an interface between the software modules and the software applications; configuring the shared services hub to recognize the communications protocols of the plurality of software modules and the software applications; enabling the plurality of applications to communicate with the shared services hub using at least one communications protocol that differs from a communications protocol of at least one of the software modules; and using the shared services hub to translate communications between software applications and software modules so that regardless of the communications protocols employed by the software modules, each of the plurality of applications is capable of communicating with the modules through the shared services hub.

Other independent features and advantages of the shared services platform will become apparent from the following detailed description, taken in conjunction with the accompanying drawings which illustrate, by way of example, the principles of the invention.

BRIEF DESCRIPTION OF THE DRAWINGS

The accompanying drawing, which is incorporated in and constitutes a part of the specification, illustrates several embodiments of the invention and together with the description, serves to explain the principles of the invention.

DETAILED DESCRIPTION OF THE PREFERRED EMBODIMENT

Figure 1:
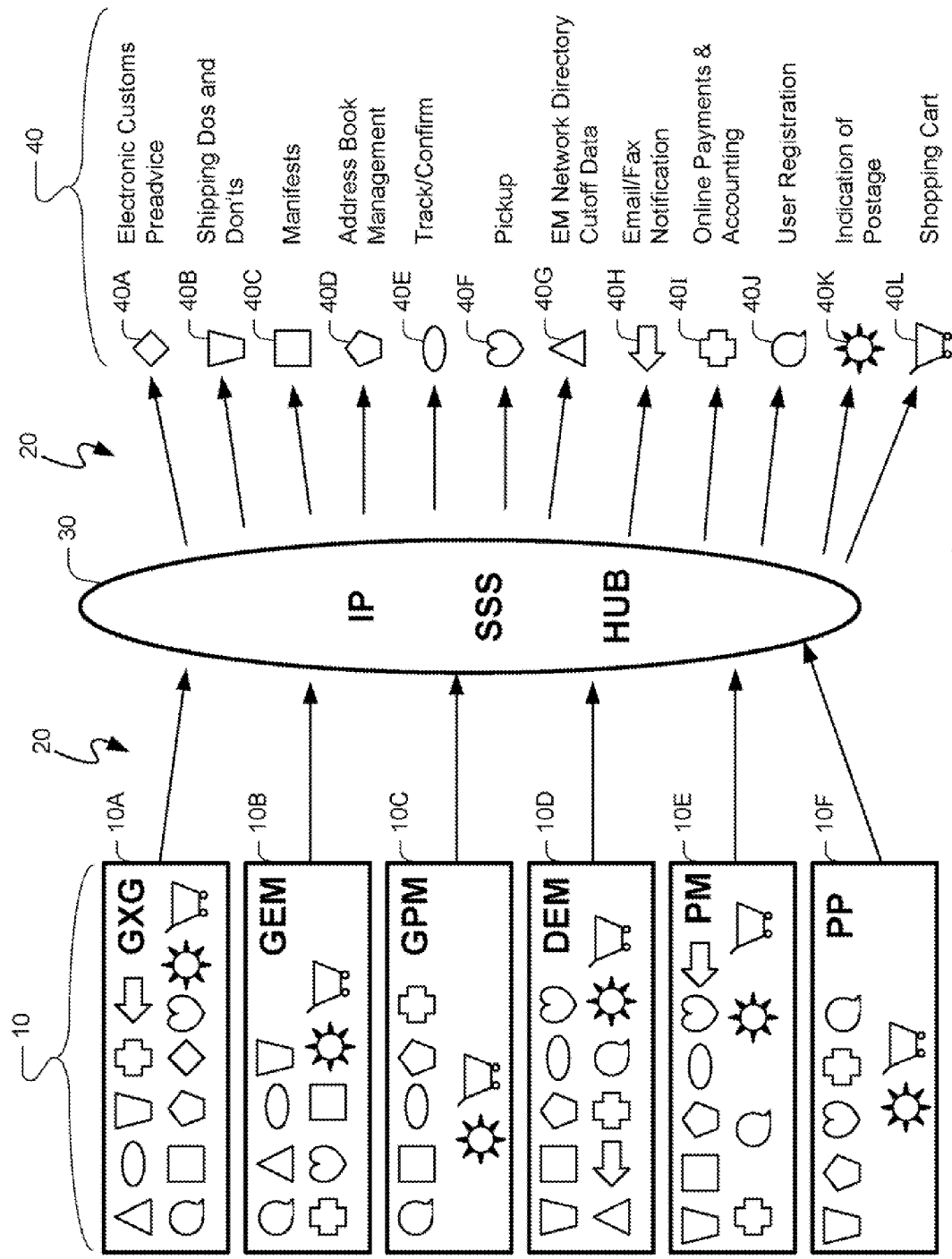
FIG. 1 is a schematic diagram of a system incorporating the shipping shared services invention.

An embodiment of the invention is discussed below in connection with FIG. 1. The left side of FIG. 1 schematically illustrates six software applications 10. Each of the illustrated applications is a separate product that customers might access over a network such as the internet. Specifically, "GXG" 10A represents the U.S. Postal Service's (USPS's)Global Express Guaranteed service. This is a day-certain, time-guaranteed delivery service. "GEM" 10B represents Global Express Mail service which is a 2-3 day expedited delivery service that is not guaranteed. "GPM" 10C is Global Priority Mail service, which is a less expensive international service for delivering mail in 3-5 days.

On the domestic front, "DEM" 10D represents Domestic Express Mail which, like its international Global Express Guaranteed counterpart, is a domestic guaranteed service. "PM" 10E represents Priority Mail. Priority Mail is an express domestic service that allows customers to obtain additional services such as delivery confirmation. "PP" 10F represents Parcel Post, which is the USPS's standard domestic delivery service.

The right-most column of FIG. 1 reflects a series of service capabilities or software modules 40 that might be shared by the six applications 10. These modules have been assigned a shape on the drawing that corresponds to possible use in the applications 10 as explained in more detail below. From top to bottom, "Electronic Customs PreAdvice" 40A is a service currently offered for international shipping only. It processes information about a package, customs information, the contents of the package, and the laws of various foreign countries, and it pre-advises a customer as to whether the shipment might violate some rule or might subject the package to unique treatment. It electronically transmits ahead of the physical parcel, information about the parcel to the customs agency in the intended recipient's country. Thus, if there are any issues with the package, the customs agency may deal with those issues in advance. When the package enters customs and the recipient's country, it is scanned, the associated record may be viewed, and it might be determined that all issues with the package have already been dealt with.

"Shipping Dos and Don'ts" 40B is a software module that advises customers on acceptable and non-acceptable shipping practices. The "Manifests" 40C module may allow for the creation of a shipping record that provides a list or print-out of information associated with all parcels shipped as a group.

"Address Book Management" 40D is a software package that enables the USPS to maintain customers' address books. In this way, every time a customer makes a shipment, the customer might view previous recipients, and be able to capture a previous recipients' address information onto a new shipping label. Alternatively, to alleviate customers' potential privacy concerns, the system can be configured to link with an address book maintained locally on customers' computers.

The "Track/Confirm" module 40E allows customers to track parcel movement during the delivery process and to confirm delivery.

The "Pick-Up" software module 40F enables customers to request parcel pick-up at a home or office. This module may require the customer to pay an additional fee for the pick-up service.

"EM Network Directory Cut-off Data" 40G is a module that advises customers of cutoff times for dropping-off parcels.

"E-mail/Fax Notification" 40H is a module that provides automated notification of events such as delivery.

"Online Payments and Accounting" 40I is a financial engine that allows customers to make deposits to their accounts and to pay for services over the internet.

"User Registration" 40J, as discussed previously, is a software module that collects information about the customer.

"Indication of Postage" 40K is a mechanism for electronically providing the customer with information that may be printed out and affixed to a parcel to reflect postage paid. Without such an indication, the customer would have to stop at the retail counter of the Post Office and make a payment prior to depositing a parcel into the mailstream.

"Shopping Cart" 40L is a module that allows customers to select multiple services for purchase and then pay for them all at once.

As illustrated in FIG. 1, a shipping shared services "SSS" hub 30 is interposed between the software applications and the software modules. In operation, the customer interfaces with the software applications 10 over a network, which could be the internet or another network of any kind.

Application Program Interfaces (APIs) represented by the arrows 20 in FIG. 1, enable the application software to communicate with the hub, and enable the hub to communicate the various software modules. While FIG. 1 illustrates each software module separate from the hub, it is conceivable and within the spirit and scope of the invention to include one or more of the software modules (or applications) within the hub.

The software modules 40 on the right side of FIG. 1 can be accessed and used by a customer while the customer uses the applications 10 on the left side of the figure. Thus, when a customer logs onto the Postal Service's website to use the Global Priority Mail application 10C, a customer might access User Registration 40J, Manifests 40C, Track/Confirm 40E, Address Book Management 40D, Online Payments and Accounting 40I, Indication of Postage 40K, and Shopping Cart 40L Capabilities. Similarly, a customer using the Global Express Guaranteed 10A application might access to those same modules plus the additional modules of EM Network Directory Cut-Off Data 40G, E-mail/Fax Notification 40H, Shipping Dos and Don'ts 40B, Electronic Customs Pre-Advice 40A, and Pick-Up 40F capabilities. Thus, for example, a customer familiar with the registration capabilities of one application will automatically be familiar with the registration capabilities of all others. In addition, rather than maintaining a separate administration function for each of the capabilities associated with each application, a single administration function may be maintained for each capability, reducing duplication of efforts.

In one embodiment of the present invention, software modules 40 and software applications 10 may be written in a plurality of different programming languages. Further, the software applications 10 and software modules 40 may communicate through a plurality of differing communications protocols.

In a preferred embodiment, software modules 40 reside on a first plurality of servers and software applications 10 reside on a second plurality of servers. Hub 30 is configured so as to recognize, accept, translate, and communicate with the communication protocols of the plurality of software modules 40. Also, applications 10 are preferably enabled to communicate with hub 30 through at least one communication protocol that differs from a communication protocol of at least one software module 40. Thus, still in a preferred embodiment, hub 30 translates communications between software applications 10 and software modules so that regardless of the communications protocols used by the software modules 40, each of the plurality of applications 10 is capable of communicating with modules 40 through the shared services hub 30.

In a preferred embodiment, the shipping shared services hub 30 allows a postal customer a seamless approach to information related to a postal transaction. Thus, for example, where a customer seeks to mail an item via a certain postal product, the customer can first access the internet website related to that service. If the chosen product is Parcel Post, the customer can access the site related to the Parcel Post product 10F. At that point, the customer can choose from a number of other modules 40 to access. Thus, if the customer seeks information related to postage 40K, the customer selects that module. Information from the postage module 40K, accessed via the shared services hub, is translated so that it can be presented in a format consistent with the Parcel Post site. In this way a customer could, for example, calculate postage for the intended transaction. Similarly, once a mailpiece has been entered into the delivery process, information can be tracked regarding the mailing. Thus, for example, if a mailpiece was submitted for international shipping using Global Express Mail, a customer could first access the website related to that product 10B. Other software modules 40 will have information related to the particular postal transaction. For example, the Track/Confirm module 40E will have information related to the progress of the mailpiece through the delivery process toward its destination. A customer, accessing the Global Express Mail 10B website, can then access Track/Confirm information. The Track/Confirm 40E information is accessed from the Global Express Mail location 10B by communicating, through the shared services hub 30 with the Track/Confirm software module 40E. The shared services hub 30 plays the role of translating information from the software module so that it may displayed while the customer is also accessing the product website.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for providing automated services to a freight customer comprising:

accepting at a website a first request for access to a first software application enabling purchase of freight services;

determining, by the first software application, that access to a first and a second software module enabling one of provision of information regarding the freight services and supplemental freight services is required;

communicating a second request for module execution from a first software application residing on a first plurality of servers to a first application programming interface (API) within a software translation hub;

determining, by the software translation hub:

an application communications protocol utilized by the first software application;

first and second module communications protocols utilized by respective first and second software modules wherein:

at least one of the first and the second software modules was written in a programming language that differs from the first software application; and at least one of the first and second module communications protocols differs from the application communications protocol;

translating, by the software translation hub, said second request to a format acceptable by the requested module;

communicating the translated request to the requested module via a second application programming interface within the software translation hub;

converting data derived from said first software application to a format acceptable by the first and second software modules;

converting data derived from the first and second software modules to a format acceptable to said first software application; and displaying the converted data on the website.

2. The method as defined in claim 1 wherein the first software module includes software instructions selected from the group consisting of:

allowing the freight customer to select a plurality of services for purchase and remit a single payment for all of said plurality of services after said selection;

provide the freight customer with an indicia of freight that may be affixed to an envelope or parcel;

provide information to the freight customer regarding the movement of an envelope or parcel movement after said envelope or parcel had been submitted to a freight provider;

provide information to the freight customer regarding confirmation of delivery of the envelope or parcel; and combinations thereof.

3. The method as defined in claim 1 wherein the first software module includes software instructions to effect electronic notification of delivery status of an envelope or parcel submitted by the freight customer by a method selected from the group consisting of:

sending an email message to an email account of said freight customer;

sending a fax message to a fax phone number specified by said freight customer; and combinations thereof.

* * * * *